United States Patent [19]

Chai et al.

[11] 4,266,249

[45] May 5, 1981

[54] DIGITAL ENCODER FOR FACSIMILE TRANSMISSION

[75] Inventors: Soo Young Chai, Holmdel; Helmuth O. Sautter; Wallace E. Sherbon, both of Middletown, all of N.J.

[73] Assignee: Bell Telephone Laboratories, Incorporated, Murray Hill, N.J.

[21] Appl. No.: 943,734

[22] Filed: Sep. 19, 1978

[51] Int. Cl.³ .............................................. H04N 7/12
[52] U.S. Cl. ................................... 358/260; 358/133; 358/138
[58] Field of Search ............... 358/133, 135, 138, 260, 358/263, 137

[56] References Cited

U.S. PATENT DOCUMENTS

| | | | |
|---|---|---|---|
| 2,946,851 | 7/1960 | Kretzmer | 358/138 |
| 3,128,838 | 4/1964 | Teacher | 358/137 |
| 3,294,896 | 12/1966 | Young | 358/263 |
| 3,377,423 | 4/1968 | Lippel | 358/133 |
| 3,414,677 | 12/1968 | Quinlan | 358/138 |
| 3,462,547 | 8/1969 | Macoski | 358/133 |
| 3,882,270 | 5/1975 | Ogawa | 358/260 |
| 3,953,668 | 4/1976 | Judice | 358/133 |
| 3,976,826 | 8/1976 | Fulton, Jr. | 358/133 |
| 4,150,400 | 4/1979 | Wong | 358/260 |

FOREIGN PATENT DOCUMENTS 1116720 11/1961 Fed. Rep. of Germany ........... 358/133

Primary Examiner—Joseph A. Orsino, Jr.
Attorney, Agent, or Firm—Sylvia J. Chin; Samuel R. Williamson

[57] ABSTRACT

A scheme for digitally encoding continuous-tone information from an original pictorial image includes processing electrical signals via separate networks (20,30) to generate (a) high-resolution detail data of "black" and "white" pels, and (b) low-resolution gray-scale or background data approximating the grayness of two-dimensional blocks (104) of pels (102).

In the gray-scale network (30), the electrical signals are first compared (31) to different position-dependent threshold values to generate a binary signal (108) of black and white pels which represents gray-scale. Then, any of the pels (102) determined "black" in the detail network (20) are subtracted (36) from the gray-scale binary signal to generate a modified gray-scale binary signal (110). The black pels in the modified gray-scale binary signal for each block (104) are counted (42), the count approximating the background gray level of each particular block (104) of pels (102). Subtracting the detail "black" pels generates a lighter gray level for each block (104) of pictorial area in which detail "black" pels are found. Each block count is further compressed and encoded to represent the background gray-scale information.

28 Claims, 11 Drawing Figures

FIG. 3
| 0 | 32 | 8 | 40 | 2 | 34 | 10 | 42 |
|---|---|---|---|---|---|---|---|
| 48 | 16 | 56 | 21 | 50 | 18 | 58 | 26 |
| 12 | 44 | 4 | 36 | 14 | 46 | 6 | 38 |
| 60 | 28 | 52 | 20 | 62 | 30 | 54 | 22 |
| 3 | 35 | 11 | 43 | 1 | 33 | 9 | 41 |
| 51 | 19 | 59 | 27 | 49 | 17 | 57 | 25 |
| 15 | 47 | 7 | 39 | 13 | 45 | 5 | 37 |
| 63 | 31 | 55 | 23 | 61 | 29 | 53 | 21 |
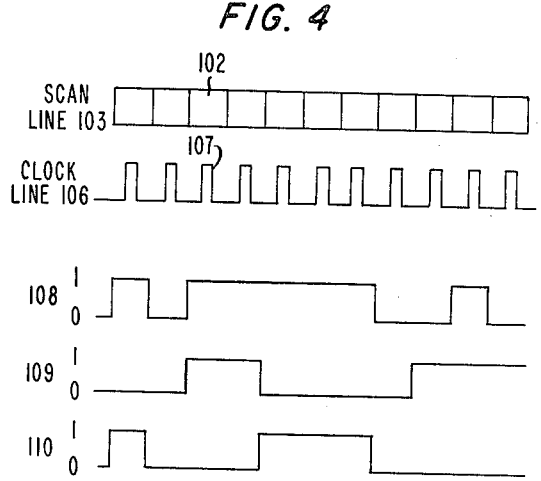
FIG. 4
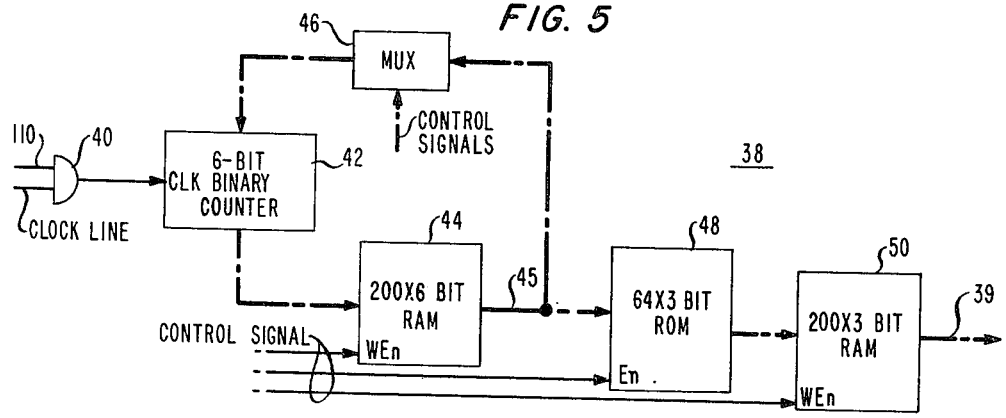
FIG. 5
FIG. 6
| NO. "N" OF BLACK PELS IN A BLOCK 104 | GRAY-LEVEL ASSIGNED | BINARY GRAY-LEVEL CODE |
|---|---|---|
| 0–7 | 1 | 000 |
| 8–15 | 2 | 001 |
| 16–23 | 3 | 010 |
| 24–31 | 4 | 011 |
| 32–39 | 5 | 100 |
| 40–47 | 6 | 101 |
| 48–55 | 7 | 110 |
| 56–63 | 8 | 111 |

DIGITAL ENCODER FOR FACSIMILE TRANSMISSION

BACKGROUND OF THE INVENTION

1. Field of the Invention

This invention relates to facsimile transmission systems, and more particularly, to the efficient encoding of continuous-tone information from an original pictorial image such that an acceptable rendition of the original picture can be reconstructed.

2. Description of the Prior Art

Facsimile transmission is a costly proposition. Each image comprises a very large amount of visual information. In conventional facsimile transmission systems, images are typically divided into a matrix of picture elements (pels) of a sufficiently small size such that when each element (pel) is scanned as having only one light intensity level, an acceptable copy results. A substantial amount of visual information is lost, but the characteristics of human perception are such that an acceptable copy can still be produced. Even with this amount of visual information, facsimile still has not been economically feasible in the past due to transmission and equipment costs as well as the long intervals required for transmission. Better image quality usually results from more information being transmitted. However, when more information is transmitted, more transmisson time is required.

Used in conjunction with the technique of scanning an image as a matrix of pels are many compression techniques designed to further reduce the amount of visual information transmitted while still producing visually acceptable copies. In some techniques, the picture information has been reduced to purely white or black pels. This results in a one bit per pel (bit/pel) transmission rate.

Where the images are two-tone, i.e., black written material on a white sheet of paper, compression techniques have been developed which require a transmission rate of substantially less than one bit per pel. This is due to the larger percentage of white background, the fairly regular grouping of black pels, and the fact that only two tones of color are of significance.

However, in the reproduction of continuous-tone or gray-scale images, such as a photographic picture, with pels having many different levels of light intensity, substantial visual information that is neither white nor black is of some significance.

Two digital techniques for continuous-tone images have been developed which result in a transmission rate of one bit per pel. These two techniques have reduced visual information transmitted while still producing an adequate and approximate reproduction of the original image. These two techniques encode all the pels into black or white signals. The compression techniques for two-tone images, mentioned earlier, however, cannot efficiently reduce the bit rates of these techniques because of the increased randomness of the black and white pels generated.

One of the prior art techniques for encoding continuous-tone images is "dither processing" wherein input electrical signals are transmitted as black or white pels after being compared to corresponding position-dependent threshold values from a two-dimensional ordered dither matrix of sample points assigned different voltage values corresponding to different light intensities. The input signals exceeding the corresponding dither thresholds are transmitted as black pels while the others are transmitted as white, resulting in a transmission rate of one bit per pel. Some additional reduction has been produced with dictionaries by approximating and grouping similar groups of pels so as to send codes. This creates problems—requiring a substantial memory storage of reference data for comparison.

The other technique for encoding gray-scale or continuous-tone information, taught by Young in U.S. Pat. No. 3,294,896, is premised on the observation that in a typical picture the fine or black and white detail which form the edges or outlines are more important than the gray of shaded areas. Hence, the gray information may be conveyed with considerably less accuracy of position and extent than is required for the detail.

In Young, the input electrical signals of an image are compared to a black threshold, a white threshold, and a third threshold which adjusts periodically to a pre-established dot pattern scheme simultaneously. Where the input signals are above the black threshold, black pels are transmitted. Where the input signals are below the white threshold, white pels are transmitted. Where the input signals are "gray", they are transformed into a sequence of black and white pels with the periodically adjusting threshold for transmission.

Greater bandwidth compression of continuous-tone images than that provided by the above techniques is desired if continuous-tone images are to be economically transmitted over conventional telephone lines on a mass scale for storage or image reproduction.

SUMMARY OF THE INVENTION

A digital scheme for efficiently encoding continuous-tone information has been developed which substantially reduces the bit rate of transmission to well below one bit per pel, while still retaining sufficient visual information to reconstruct a pleasing and acceptable reproduction of an original continuous-tone image.

It is one aspect of this invention that the input electrical signals, representing the various light intensities in voltage of the sampled portions or pels of the image being reproduced, are digitally encoded into separate high-resolution black detail and low-resolution gray-scale information for transmission via separate detail and gray-scale networks.

In the detail network, input electrical signals are compared to a predetermined threshold level for detail or black information to generate a binary signal of black and white pels. This detail binary signal from the detail circuit comparator is then compressed with any conventional and efficient compression scheme available to two-tone graphic images for transmission.

Another aspect of this invention is that the low-resolution digital gray-scale information produced represents the grayness of two-dimensional groups of pels. In the gray-scale network of the illustrated embodiment, the pels of an original image area are arbitarily subdivided into two-dimensional blocks of 8×8 pels for encoding. The input electrical signals corresponding to the pels in any block are compared to position-dependent threshold levels to generate a gray-scale binary signal. Within each block, the pels in the input electrical signals found to exceed their position-dependent threshold levels are counted to code the grayness of the particular subdivided block of pels, the count "N" approximating the average grayness or intensity of the particular block. Since there are 64 pels in each subdivided block, the count can range from 0 to 64 or 65 possible estimated gray values for the block.

The count "N" is further bandwidth reduced to be one of eight levels of gray, which is believed to be visually acceptable. The gray level of each block of pels can then be represented by three bits. In the illustrative embodiment, the 3-bit binary code results in a transmission bit rate of 3/64 or approximately 0.05 bit/pel for the encoded gray-scale information. However, the total transmission bit rate is the sum of the bit rate for the encoded gray-scale information and the compressed detail information (0.05 bit/pel for the compressed detail information in one known scheme).

A further aspect of this invention is that greater contrast is created between the gray-scale and detail information to further accentuate the edge and border information in a document. This is accomplished by generating a lighter background of gray-scale information whenever black detail signals are found in a particular block of pels.

In the illustrative apparatus, the generated black pels in the detail binary signal are subtracted from the corresponding black pels in the gray-scale binary signal so that black pels in the gray-scale binary signal corresponding to the detail black pels become white pels. This modifies the number of pels exceeding the reference position-dependent threshold levels in the gray-scale network, and thereby generates a lighter gray-scale background for the pictorial area comprised by a particular block of pels. Advantageously, this subtraction of black detail also assumes that "print" which is detail binary information will have a white rather than a gray background. Say, if a particular block in the original image includes only black print against a white background, the count generated from the modified gray-scale binary signal for the block will indicate a white background.

The invention and its further objects, features, and advantages will be readily discerned from a reading of the description to follow of illustrative embodiments.

BRIEF DESCRIPTION OF THE DRAWING

FIG. 3 illustrates an ordered dither matrix with the threshold values given in each sample point;

FIG. 4 depicts a sample of the gray-scale binary signal, a corresponding synchronized sample of the detail binary signal, and the resultant modified gray-scale binary signal;

FIG. 5 depicts in greater detail the gray-level coding circuit;

FIG. 6 is a table of gray-level codes for the black pel counts;

DETAILED DESCRIPTION

Figure 1:
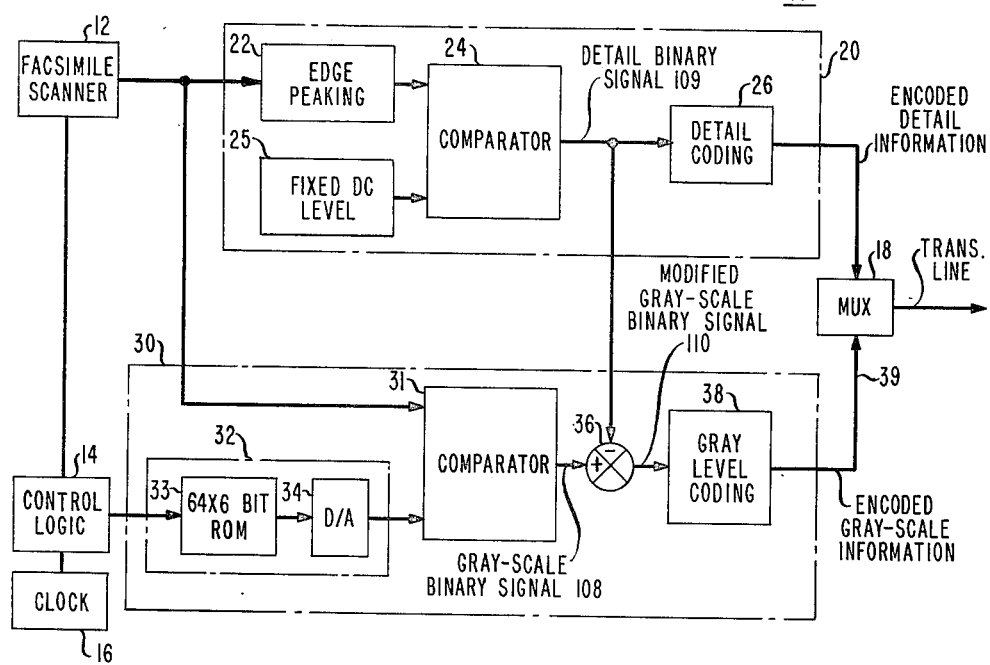
FIG. 1 is a schematic diagram of an illustrative digital encoder made in accordance with this invention.

Shown in FIG. 1 is a schematic diagram of an illustrative embodiment 10 of the inventive digital encoder for efficiently encoding continuous-tone facsimile information. The encoding apparatus 10 comprises a facsimile scanner 12 under control of a logic circuit 14 and a clock 16, a high-resolution detail encoding network 20, a low-resolution gray-scale encoding network 30, and a multiplexer 18 for combining the encoded detail and gray-scale information for storage or transmission.

Figure 2:
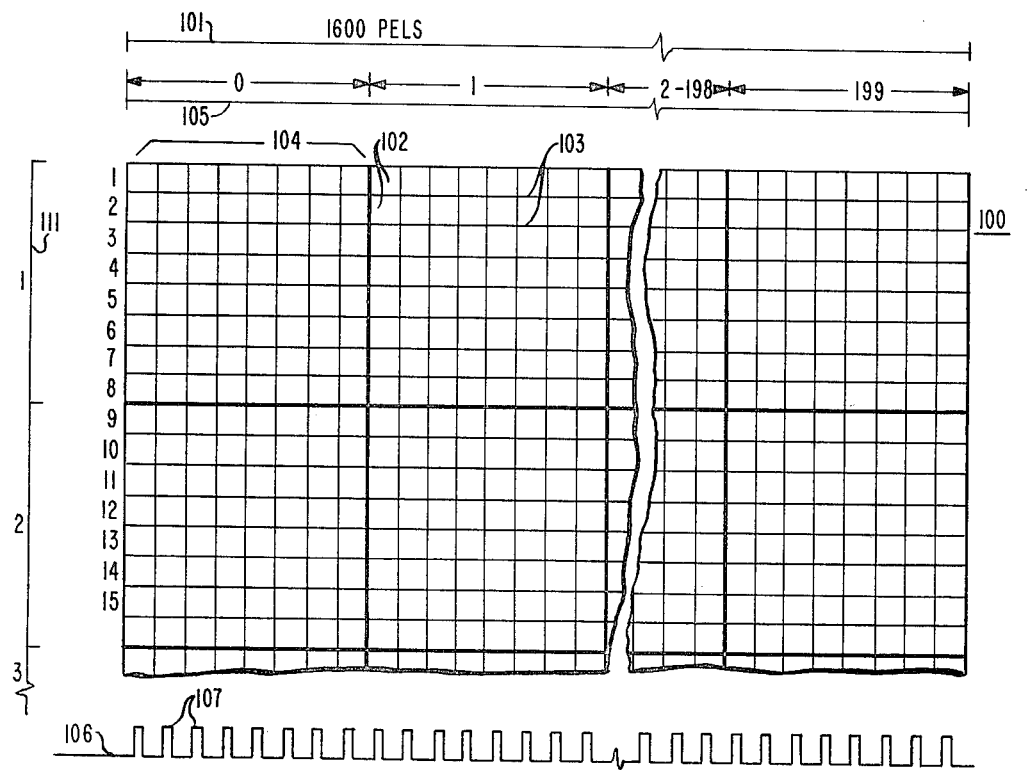
FIG. 2 illustrates the matrix of pels of an original continuous-tone image area to be sampled, the grouping of the pels into two-dimensional blocks for gray-scale encoding and a clock line with the pulses used to sample the light intensity of minute portions of the image corresponding to the pels.

The scanner 12 is a conventional scanner which scans a continuous-tone image line-by-line in raster fashion to generate sampled input electrical analog signals representative of the light intensity of the pels along a scan line. As illustrated in FIG. 2, the pictorial area 100 of an original image is treated as a matrix of discrete pels 102. The scanner 12 scans from left to right starting with the first pel on the first of the scan lines 103. After the last pel on the first line 103 has been sampled, the scanner goes on to the next line 103 to sample the pels in that line from left to right, and continues until the entire pictorial area 100 is scanned.

Control logic circuit 14 generates a pulse to scanner 12 once for every pel to be sampled, i.e., the time the scanner 12 takes to move the needed distance to sample the next pel, and takes into account scanner delays from line to line. As illustrated by clock line 106, each pulse 107 corresponds in time to each of the pels 102 in position in the image pictorial area 100. In the illustrative embodiment, 1600 pels are sampled on each scan line, as indicated by line 101, at a rate of 200 pels per inch and 200 scan lines per inch. The control logic circuit 14 determines the entire operation of generating the input electrical analog signals as well as synchronizing the rest of the encoding operations via appropriate control signals. The scanning operation is commonplace in image processing and is not further disclosed.

It should be noted that in the illustrated embodiment, the input electrical analog signals generated range from a zero voltage amplitude for white or maximum light intensity to a maximum voltage amplitude for black or minimum light intensity.

FIG. 2 also illustrates the arbitrary subdivision of the pels into 8×8 arrays or blocks 104. The pels are subdivided in this fashion to form defined pictorial areas from which to generate gray-level codes in the gray-scale encoding network 30. Each gray-level code generated represents the grayness of the entire pictorial area formed by a particular block 104 of pels 102. The blocks 104 are arranged in rows 111 with 200 blocks in each row. Each row 111 of blocks comprises eight scan lines 103 of pels. In each row 111 the blocks 104 are addressed as 0 to 199 and processed in sequential order from left to right, as denoted by line 105, in the gray-scale encoding network 30. The encoded gray-scale information is also transmitted and decoded in this sequential order. It is apparent that array sizes other than blocks of 8×8 pels can be utilized for background gray-scale encoding.

Referring back to FIG. 1, the detail encoding network 20 comprises a conventional edge-peaking circuit 22, a comparator 24, a fixed D.C. level source 25, and a detail coding network 26. The gray-scale encoding network 30 comprises a comparator 31, a dither generator 32, a subtraction circuit 36, and a gray-level coding network 38.

In operation, the input electrical signals are sent simultaneously to both the detail and gray-scale encoding networks 20 and 30 for encoding.

In the detail encoding network 20, the input electrical signals are modified as they pass through edge-peaking circuit 22 to accentuate contours and edges in the original pictorial image. The modified signals are then compared in comparator 24 to a fixed position-independent threshold level from source 25 to extract black detail information, hence generating a detail binary signal 109. The pels in the input electrical signals which are above the fixed threshold level are generated as black pels with the remaining pels being generated as white. The train of black and white pels in the detail binary signal is then compressed with any conventional coding scheme available to two-tone images in detail coding network 26. In the illustrative embodiment, a two-dimensional or blob-encoding scheme, more fully described in A. J. Frank, "High Fidelity Encoding of Two-Level, High-Resolution Images," *IEEE-International Conference on Communication,* June 11, 1973, and in U.S. Pat. No. 4,103,287, issued July 25, 1978, and assigned to the same assignee as the present invention, is advantageously used. The scheme when used for coding the detail binary signal has resulted in a resultant detail code having a transmission bit rate of approximately 0.05 bit/pel.

At the same time, the input electrical signals are applied to comparator 31 in the gray-scale encoding network 30. The comparator 31 compares the input electrical signals to position-dependent dither reference threshold values from dither generator 32 to generate a gray-scale binary signal 108. The pels in the input signals exceeding their assigned reference threshold values become black and those less than or equal to their assigned thresholds become white in the gray-scale binary signal.

The dither generator 32 comprises a read only memory (ROM) 33 with predetermined position-dependent reference threshold values stored in digital form from an ordered dither matrix and a D/A converter 34. The ROM 33 is under control of the control logic 14 to generate at the appropriate time for comparison the predetermined position-dependent threshold value assigned to each pel 102. The dither threshold values are converted to analog form prior to comparison in comparator 31 because the input signals are analog. It is apparent that the input signals could be digital rather than analog, hence eliminating the need for a D/A converter.

As mentioned earlier, an ordered dither matrix comprises a two-dimensional array, here it is 8×8, of sample points having different threshold values in voltage amplitude. Each sample point in the dither matrix is assigned to a specific pel 102 in each subdivided block 104 in the pictorial area 100 for the original image. The average threshold value for the sample points in the matrix is typically halfway between the black and white voltage amplitudes.

An ordered dither matrix, which can be used, is depicted in FIG. 3. The threshold values, representing a range of brightness levels with amplitude values from 0 to 63, are depicted in their assigned sample points and can be visualized as overlaying a block 104 of pels 102. Dithered reference threshold values are normally used to produce a pleasing subjective impression of overall image texture in a reproduced image, but is used to approximate grayness in the illustrated encoder 10. Using an ordered dither matrix of thresholds preserves pel resolution which is desirable for subtraction of the detail binary signal, to be described later. However, it is apparent that other matrices having various position-dependent thresholds can be used.

In the illustrative encoder 10, the gray-scale binary signal 108 generated by the gray-scale circuit comparator 31 is modified prior to coding. The detail binary signal 109 generated by the comparator 24 and the gray-scale binary signal 108 are both applied to subtraction circuit 36. The black pels in the detail binary signal 109 are subtracted from the corresponding black pels in the gray-scale binary signal 108 so that black pels in the gray-scale binary signal 108 corresponding to the detail black pels become white pels. Whenever there is black detail information in a particular block, it usually modifies the number of pels exceeding the dither reference threshold values to generate a lighter gray-scale background for the pictorial area comprised by the particular block 104 of pels.

FIG. 4 shows an illustrative sample of the gray-scale binary signal 108 and how it is modified by the corresponding synchronized detail binary signal 109 to generate the resultant modified gray-scale binary signal 110. A black pel is denoted 1 and a white pel is denoted 0 in the FIG. 4 signals. If there is a black pel in the detail binary signal 109 and in the gray-scale signal 108, the corresponding pel in the modified gray-scale binary signal 110 is white. A line 103 of pels 102 and a clock line 106 are depicted for comparison with the sample signals.

The modified gray-scale binary signal 110 comprising a train of black and white pels is then sent to the gray-level coding circuit 38, depicted in greater detail in FIG. 5. The gray-level coding circuit 38 comprises an AND gate 40, a 6-bit binary counter 42, a 200×6 bit random access memory (RAM) 44, a multiplexer 46, a 64×3 bit read only memory (ROM) 48, and a 200×3 bit random access memory (RAM) 50.

In operation, the modified gray-scale binary signal 110 and an appropriate sampling clock signal are added in AND gate 40 to send an on pulse for each black pel to counter 42. The scanner 12 samples the pels 102 on a line-by-line and a block-by-block basis. Hence, on each scan line 103, 8 pels of a block 104 are counted before the pels of the next block 104 feed into counter 42. The coding circuit 38 counts the blocks 104 on a row-by-row basis.

After counter 42 accumulates the number of black pels in the current line 103 of 8 pels for a particular block 104, RAM 44 is enabled with a control signal from control logic 14 to store the accumulated count in the memory address designated for that block 104. The blocks 104 are addressed according to line 105 in FIG. 2. Of course, RAM 44 is controlled by an appropriate conventional address generator to ensure that the accumulated count is stored in the appropriate address at the appropriate time.

When the entire first scan line 103 of pels 102 has been counted, a count for the first line has been stored for each of the 200 blocks in the first row. Then, the modified gray-scale binary signal 110 for the second line 103 is gated into counter 42. Before the first pel in the second line for the current block 104 is to be counted, the count tallied from the previous line for the current block 104 is stuffed into counter 42 via multiplexer 46. After the pels of the second line for the current block 104 have been added, the new accumulated count is stored into RAM 44 in the appropriate address. Counter 42, in cooperation with RAM 44 and multiplexer 46, continues to accumulate the count for each block 104 of pels 102 line-by-line until the total count of black pels in each block 104 in a row has been generated and temporarily stored in RAM 44.

During the first line counting of the next row of blocks and more particularly when the first line in a block of pels is being counted, the accumulated count of the previous row's block that has the same address as the current block is output onto line 45 and sent to ROM 48, which has been enabled to receive the count. After the last row of blocks has been counted, control signals from control logic 14 cause coding circuit 38 to run one more scan line 103 to send the accumulated total counts of the last row 111 of blocks to ROM 48.

As mentioned earlier, there can be 65 levels of gray because any of the 64 pels in each block can be white or black. However, only counts of 0 to 63 occur because one dither reference threshold, i.e. 63, is equal to the fixed threshold level used in the detail encoding network 30. Hence, if that particular pel is black in the gray-scale binary signal, it becomes white when processed through subtraction circuit 36. If no pels are black, the count is zero.

The total counts of black pels are output on lead 45, each at the appropriate time, to address a particular address memory in ROM 48 to generate the particular three-bit gray-level code assigned to the particular count of black pels. The table in FIG. 6 lists the assignment. If a particular block has from 0-7 black pels, a code of 1 is sent, etc. Only codes for eight levels are assigned since this is adequate for background gray.

The gray-level code, being of three bits, results in a code or transmission bit rate of 3/64 or approximately 0.05 bit/pel for the low-resolution gray-scale information in the illustrated embodiment. The detail information and the gray-scale information are coded separately and result in a compression of approximately 0.1 bit/pel.

After ROM 48 generates the three-bit gray-level code for each total block count, the generated code is stored in an appropriate memory address in the RAM 50, which has been enabled by control logic 14 at the appropriate time. RAM 50 generates the stored codes for transmission in sequantial order when called for by control logic 14.

Multiplexer 46 is controlled by signals from control logic 14 to stuff zeroes in as the initial count before counting each first line in each block 104. At all other times, multiplexer 46 switches to insert the accumulated count for the previous line of the current block 104 into counter 42.

The encoded detail and gray-scale information can be transmitted directly via separate channels for storage or to a receiver, or else multiplexed by multiplexer 18. In the illustrative embodiment, the encoded information is sent on a row-by-row basis. For each row 111, the encoded detail information is transmitted first via multiplexer 18 for the corresponding eight scan lines 103 of pels after which the encoded gray-scale information from RAM 50 for the row 111 of blocks 104 is sent. It is apparent that the gray-level codes can be sent first.

Figure 11:
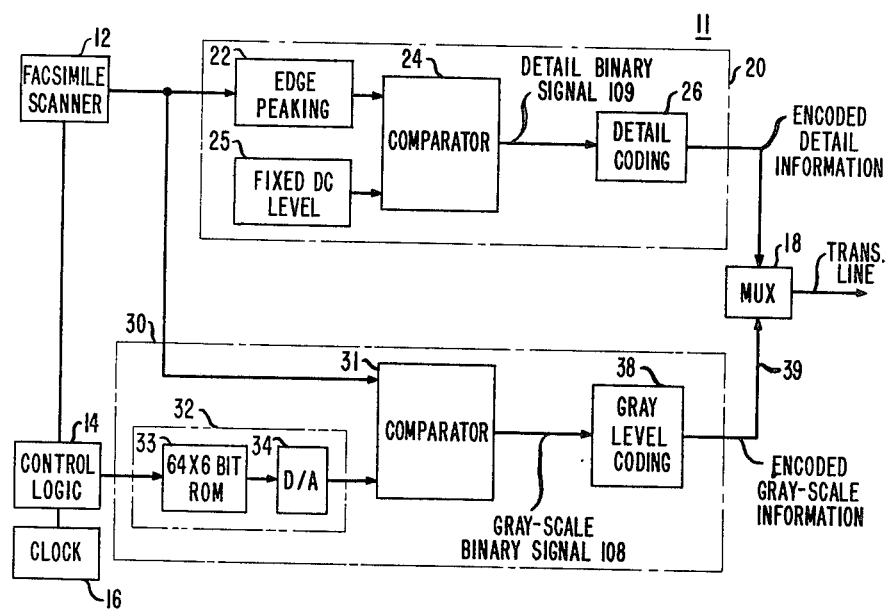
FIG. 11 depicts in schematic diagram another embodiment of the digital encoder.

FIG. 11 depicts another encoder 11 made pursuant to this invention. In this embodiment, the detail binary signal 109 does not modify the gray-scale binary signal 108 before gray level coding. The components in encoder 11 that correspond to like components in the FIG. 1 encoder 10 are indicated by like reference numerals.

Figure 7:
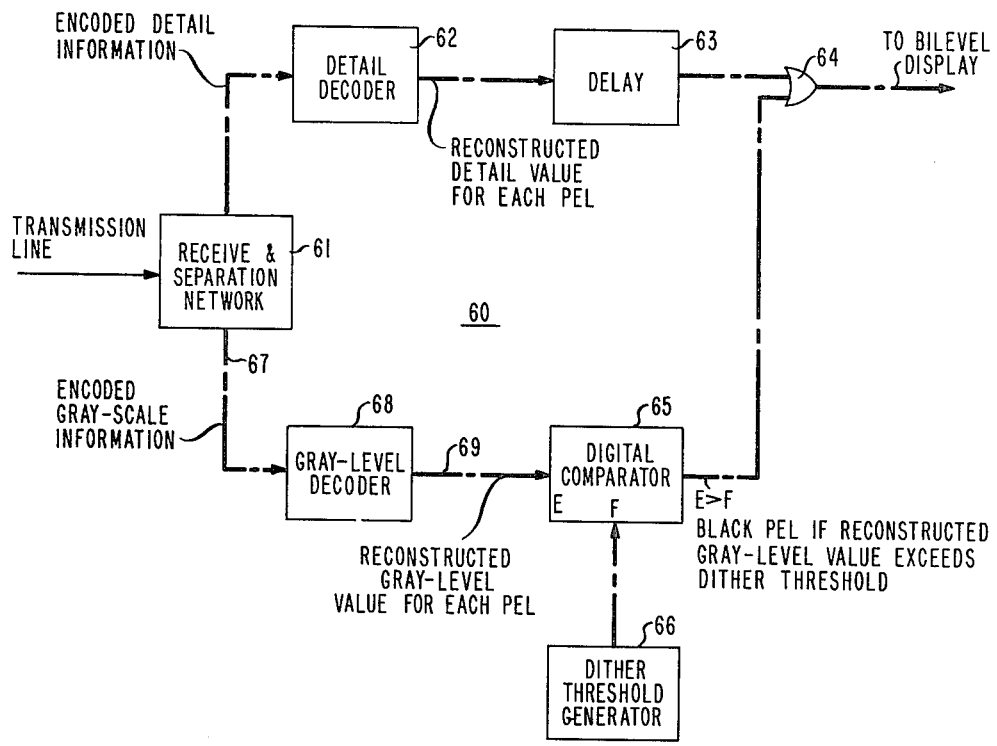
FIG. 7 depicts in block diagram a receiving network which reconstructs the encoded detail and gray-scale information for bi-level display.

To reconstruct the original image at a receiving end of a facsimile transmission system, the detail and gray-scale codes are reconstructed for each pel as depicted in the FIG. 7 block diagram of a receiving network 60. After reconstruction, the reconstructed detail and gray-level values assigned to each pel are superimposed to reconstruct the electrical value of each particular pel for reproduction, two-tone reproduction in the illustrative embodiment.

The illustrative receiving network 60 comprises a receiving and separation circuit 61 for receiving the encoded information and other conventional sync signals and for sending the encoded information to separate detail and gray-scale decoding networks. The detail decoding network comprises a detail decoder 62 and a delay circuit 63. The encoded detail information is decoded in a conventional detail decoder 62, which corresponds to the selected detail coder 26. Then, the reconstructed detail stream of black and white pels is sent through delay circuit 63 to be synchronized with the reconstructed gray-scale stream of pels for combining at OR gate 64.

The gray-scale decoding network comprises a gray-level decoder 68, a digital comparator 65, and a dither threshold generator 66.

In the illustrated encoder 10, each block 104 of pels is assigned a gray-level code. However, if the pels are reconstructed directly from the code, there can be abrupt changes in tonal or gray levels between blocks 104 of pels. Hence, a further aspect of this invention is that each block 104 of pels is compared in both the horizontal and vertical directions with at least some of the neighboring blocks to eliminate the effect of square patterns by causing a gradual change in gray level for the pels in each block and from block to block. It is apparent that only horizontal or vertical modifications might be performed.

Figure 8:
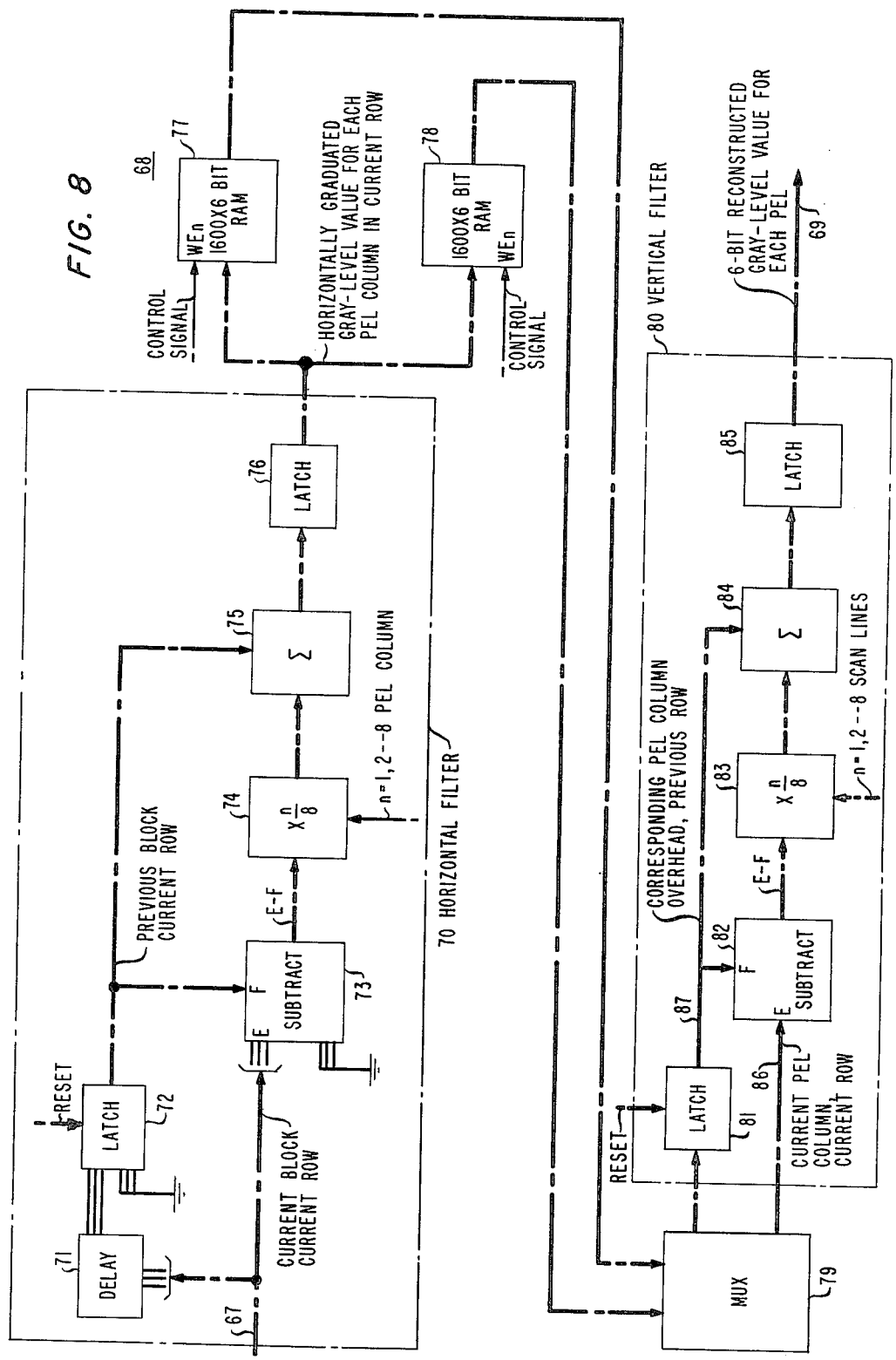
FIG. 8 depicts a gray-level decoder which can be used at the receiver to reconstruct a gray-level value for each pel.

FIG. 8 depicts in schematic diagram a gray-level decoder 68 for generating a reconstructed gray-level value for each pel. The FIG. 8 gray-scale decoder 68 comprises a horizontal filter 70, two 1600×6 bit random access memories 77 and 78, a multiplexer 79, and a vertical filter 80. The horizontal filter 70 comprises a digital subtraction circuit 73, a delay circuit 71, an incremental multiplier 74, a digital adder 75, and latches 72 and 76. The vertical filter 80 comprises a subtraction circuit 82, an incremental multiplexer 83, a digital adder 84, and latches 85 and 81.

Figure 9:
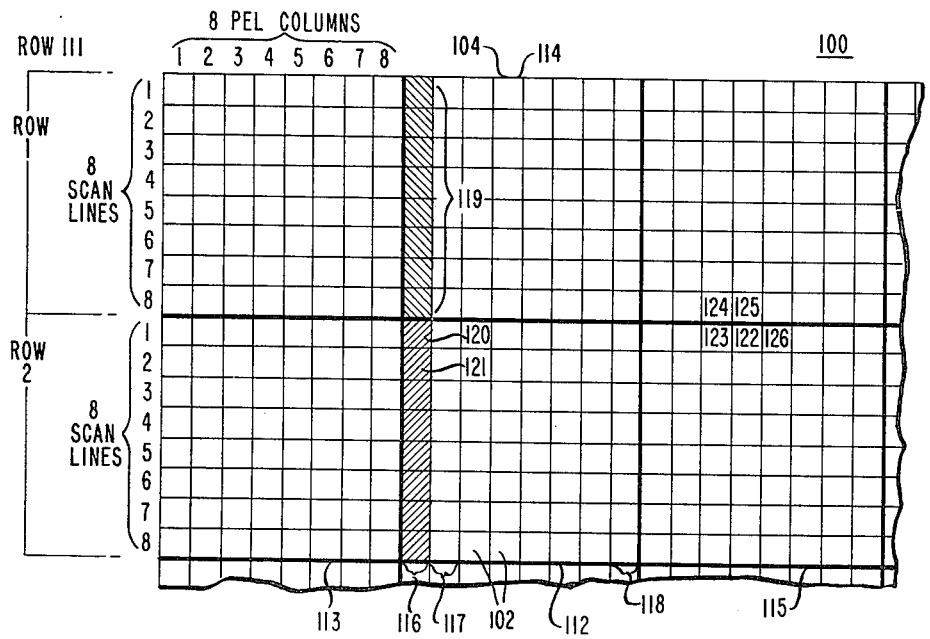
FIG. 9 references the blocks and the pel columns for describing the FIG. 8 gray-level decoder, as well as the pels for the FIG. 10 gray-level decoder.

It should be recalled that in the illustrative embodiment, the gray-level codes for the blocks 104 are transmitted on a row-by-row basis beginning with the block on the extreme left in each row 111 in sequential order. FIG. 9 depicts the blocks 104 in rows 111 with each block comprising eight columns of 8 pels and eight scan lines of 8 pels. With 200 blocks 104 in a row 111, there are 1600 corresponding columns of pels in each row 111. Each column in a row 111 aligns with a corresponding column in the next row 111, as shown by shaded columns denoted 119 and 116, respectively.

In operation, the horizontal filter 70 compares the gray-level code of each current block in a current row 111 to the gray-level code of the preceding block in the same row to generate a horizontally graduated gray-level value for each column in the current block. Then, the vertical filter 80 compares the horizontally graduated gray-level value for each column in the current row with the value of the corresponding column overhead (already derived from the gray-level codes of the previous row of blocks) to vertically interpolate and generate the reconstructed gray-level value for each pel in the particular column in the current row of blocks.

For purposes of illustrating the actual operation of the filters 70 and 80, assume that the reconstructed gray-level values are being generated for the pels 102 in a current block denoted 112 in FIG. 9. The horizontal filter 70 first receives the gray-level code of current block 112. This code is entered into subtraction circuit 73 to subtract the gray-level code of the previous block denoted 113 in the same row to generate a digital 6-bit positive or negative horizontal difference.

The horizontal difference is then multiplied in multiplier 74 eight times. The first time, the horizontal difference is multiplied by $\frac{1}{8}$ to generate a first horizontal incremental value. This first horizontal incremental value is then added to the gray-level code of the previous block 113 to generate a horizontally graduated gray-level value for the first column 116 of pels in current block 112, the column most adjacent to the previous block 113. This value is strobed at the appropriate time by latch 76, and stored in, say RAM 77, in the address designated for the column.

To generate the horizontally graduated gray-level value for the second column 117 of pels, the difference is multiplied by 2/8 to generate a new horizontal incremental value which is added to the gray-level code of the previous block 113. This continues until a horizontally graduated gray-level value is generated for each column in current block 112. The eighth column 118, or the one on the extreme right for the current block 112, is assigned the gray-level code (in 6-bit form) of the current block 112; the horizontal difference, multiplied by 8/8, is the horizontal incremental value for the eighth column.

Current block 112 then becomes the previous block in the row for generating the horizontally graduated gray-level values for the next block 115. This process continues until horizontally graduated gray-level values are generated for each column in the row, i.e., 1600 6-bit values, which are stored in RAM 77. It is apparent that if only one dimensional filtering is satisfactory, the horizontally graduated value can be assigned to all eight pels in the particular pel column.

It should be noted at this time that RAMs 77 and 78 both feed into vertical filter 80 via multiplexer 79. Multiplexer 79 switches the inputs for vertical filter 80 so that the values of the so called current row feeds in on lead 86. This is because the RAMs 77 and 78 store alternate rows 111 of the horizontally graduated gray-level values. It is apparent that the RAM assigned to store a particular row 111 is enabled to store only during the generation of the horizontally graduated gray-level values for that row of blocks.

Since the horizontally graduated gray-level values of the current row 111 containing current block 112 are stored in RAM 77, RAM 78 would have already stored the horizontally graduated gray-level values of the previous row 111 of blocks.

To generate the reconstructed gray-level value for each pel in block 112, the vertical filter 80 compares the horizontally graduated gray-level value of each column in block 112 with the value of the corresponding column overhead in the previous row in sequential order. First, the horizontally graduated gray-level value of a column denoted 119 overhead in block 114 in the previous row is subtracted from the horizontally graduated gray-level value for the first column denoted 116 in the current block 112 to generate a positive or negative vertical difference. This vertical difference is then multiplied by some multiple of $\frac{1}{8}$ in multiplier 83 to generate a vertical incremental value. The vertical incremental value is added to the horizontally graduated gray-level value for the column 119 overhead to generate a reconstructed gray-level value for one of pels in the current column.

Where the multiplier value is $\frac{1}{8}$, the reconstructed gray-level value of the pel denoted 120, adjacent to the pel column 119 overhead and in the first line of current block 112 is generated. Where the multiplier value is 2/8, the reconstructed gray-level value of the pel denoted 121 in the second line of current block 112 for column 116 is generated, and so on. Then, the next column 117 is interpolated with its corresponding column overhead. This continues until a reconstructed gray-level value has been estimated for each pel in block 112.

In actual operation, however, the reconstructed gray-level values of the pels in each row 111 of blocks are generated on a line-by-line basis. To generate the gray-level values for the pels in a current scan line, the horizontally graduated gray-level value of each column in the current row containing the current scan line is compared to the horizontally graduated gray-level value of each corresponding column overhead in the previous row in sequential order to generate only the pels in the current line.

The extreme left and first columns in the two rows are compared first to generate the first pel in the first current column (first pel on the first line of the current row of blocks). Then, the second columns in the two rows are compared to generate the first pel in the second current column (or the second pel on the first line for the current row of blocks), and so on, until a reconstructed gray-level value has been generated for each pel in the first line of the current row. Then the columns of the two rows are again compared sequentially across to generate the reconstructed gray-level values of the pels on the second line of the current row of blocks. This continues until all eight lines of pels have been generated.

For the blocks 104 along the left and upper edges of the image pictorial area 100, there is no previous block in the same row or columns overhead. Latches 72 and 81 in horizontal filter 70 and vertical filter 80, respectively, provide input values of zeroes at the appropriate times. Latch 72 resets during the horizontal filtering of the first block in any row to feed in zeroes to subtraction circuit 73 and adder 75 for calculating purposes. At all other times, latch 72 strobes through the gray-level code of the previous block in 6-bit form, the binary gray-level code being the more significant bits. Latch 81 resets to feed in zeroes to subtraction circuit 82 and adder 84 via cable 87 during reconstruction of the gray-level values for the pels in the first row of blocks. Hence, the first row of columns are compared to zeroes.

A nondetrimental lightening at the two edges of the image results.

As readily apparent from above, the FIG. 8 gray-level decoder 68 estimates a reconstructed gray-level value for each pel by linearly interpolating the gray-level code of a block 104 with the gray-level codes or some variation derived therefrom of adjacent neighboring blocks.

Figure 10:
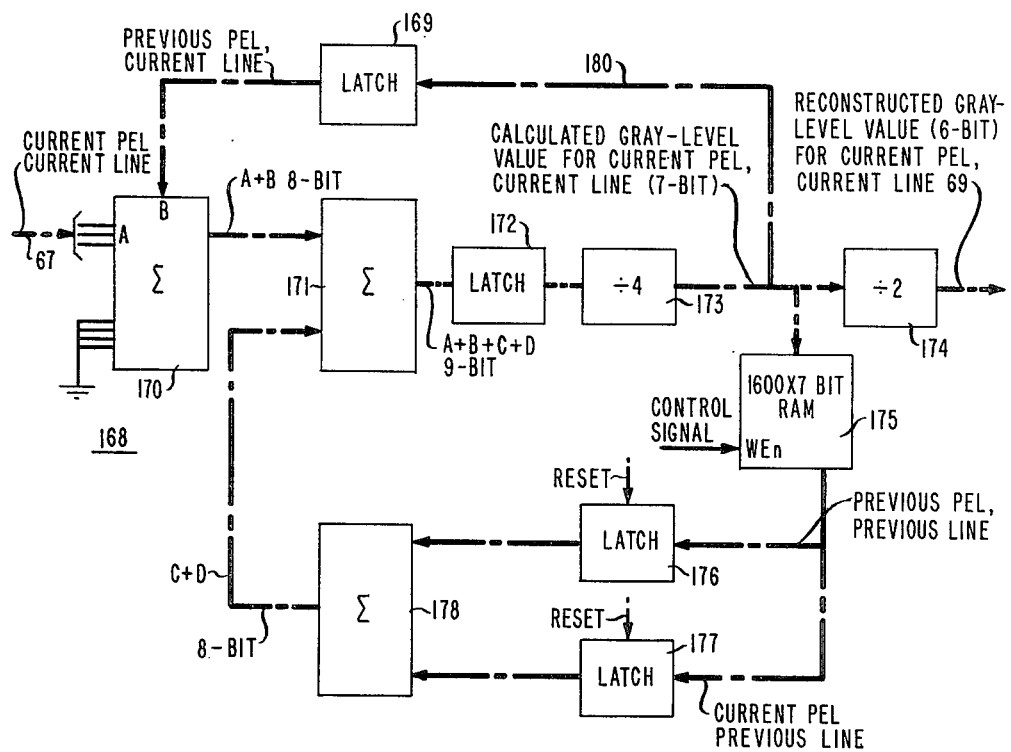
FIG. 10 illustrates in block diagram an alternative gray-level decoder.

An alternative gray-level decoder 168 is depicted in FIG. 10.

The FIG. 10 gray-level decoder 168, a two-dimensional nonlinear digital filter, comprises a first digital adder 170, a second digital adder 171, a divider 173, a 1600×7 bit random access memory 175, a third digital adder 178, a divider 174 and latches 169, 172, 176, and 177.

Referring to FIG. 9 and the FIG. 10 gray-scale decoder 168, the reconstructed gray-level value of a current pel denoted 122 is calculated from four values: (a) the gray-level code denoted A for the block containing pel 122; (b) a calculated value denoted B for the previous pel denoted 123 on the same or current scan line; (c) a calculated value denoted C for the previous pel denoted 124 on the previous scan line; and (d) a calculated value denoted D for the current pel denoted 125 on the previous scan line.

In operation, the gray-level code of block 115 containing the current pel 122 being calculated is fed into first digital adder 170 as the most significant bits in a 7-bit value along with the calculated value B for the previous pel 123 which is sent via lead 180 from divider 173 through latch 169. The resultant digital sum (A+B) is then sent to second digital adder 171, to be added with the digital sum of the calculated values (C+D) of the previous pel 124 and the current 125 pel on the previous scan line from third adder 178.

After the four values have been summed in the second adder 171, the resultant sum is strobed into divider 173 via latch 172 to generate the calculated value (in 7-bit form) for the current pel 122. The value for pel 122 can now be sent back to adder 170 as the calculated gray-level value B for the previous pel in the same line to calculate the value of the next pel 126 in the line; this value for pel 122 is also stored in the appropriate memory address in RAM 175 for use in calculating the gray-level values for the pels in the next line. Because the calculated value for current pel 122 is stored in the same address as the calculated value for the current pel 125 in the previous line, RAM 175 is instructed to output the calculated value for pel 125 to be used as the value C in calculating for pel 126 before storing the calculated value for pel 122.

The calculated value for each pel is then divided again by divider 174 to generate a reconstructed gray-level value in 6-bit form for additional processing. This is desirable so that the gray-level value of each pel can be compared to its corresponding 6-bit dither reference threshold.

For the pels on the left and top edges of the image, the reconstructed gray-level values are based on zero values for adjacent pels since no such pels exist. The error is acceptable since information on the margin of a document is seldom of importance. Latches 169, 176, and 177 strobe in zeroes at the appropriate times. Latch 169 strobes zeroes to adder 170 during processing of each first pel of each scan line. Latch 176 strobes zeroes to adder 178 during the processing of the entire first scan line of the original image and during the processing of the first pel of each scan line. Latch 177 strobes zeroes to adder 178 during the processing of the entire first scan line of the original image.

Referring back to FIG. 7, the reconstructed gray-level values (in 6-bit form) for the pels from either gray-level decoder 68 or 168 are compared in digital comparator 65 with assigned position-dependent reference thresholds from dither threshold generator 66 to generate a binary signal indicating whether the particular pels should be reconstructed as black or white. This dithered reconstructed gray-scale binary signal is then sent through "OR" gate 64 with the decoded detail binary signal for superimposition and sent to a conventional two-tone image reproducing device.

The reconstructed gray-scale values and the reconstructed detail information are synchronized to represent the appropriate pels with delay circuit 63 in the receiving network 60.

While the invention has been described with reference to specific embodiments, it is to be understood that various modifications thereto might be made without departing from the spirit and scope of the following claims.

We claim:

1. Apparatus for digitally encoding continuous-tone information from an original pictorial image having a total pictorial area (100) comprising means for scanning (12) discrete areas of said original image known as pels (102) on a line-by-line basis to generate input electrical signals indicative of the light intensity of each pel, and first means for comparing (24) said input signals to a predetermined position-independent threshold signal to generate a detail binary signal (109) of black and white pels, said apparatus further characterized by:

second means for comparing (31) said input signals to predetermined position-dependent reference threshold signals from a matrix of sample points to generate a gray-scale binary signal (108) of black and white pels, each of said sample points assigned by position to a particular pel from each of a plurality of subdivided two-dimensional blocks (104) of pels, each block forming a discrete pictorial area of the total pictorial area (100) of said original image; and means for counting (42) the black pels in said gray-scale binary signal for each two-dimensional block to generate a value "N", which approximates the gray-level information of each subdivided block of pels.

2. Apparatus pursuant to claim 1 further comprising: means for converting (48) said value "N" to a gray-level binary code.

3. Apparatus pursuant to claim 1 further comprising: means for peaking (22) said input electrical signals before transmission to said first comparing means (24) to accentuate the contours and edges in said original image.

4. Apparatus pursuant to claim 1 further comprising: means for subtracting (36) said detail binary signal (109) from said gray-scale binary signal (108) to modify said gray-scale binary signal prior to transmission to said counting means (42) to generate a lighter gray level for said blocks of pictorial area where black detail pels are generated.

5. Apparatus pursuant to claim 1 further comprising means for compressing (26) said detail binary signal (109) according to a blob-encoding scheme.

6. Apparatus pursuant to claim 1 where said position-dependent reference threshold signals are generated from an ordered dither matrix.

7. A facsimile transmission system including said encoding apparatus of claim 2 further comprising:
- means for receiving (61) said detail binary signal and said gray-level codes; and
- means for reconstructing (68, 168) a gray-level value for each said pel (102) from said gray-level codes for said blocks (104) of pels.

8. Apparatus pursuant to claim 7 where said gray-level reconstructing means comprises:
- means for interpolating (70) said gray-level code of said block containing a particular pel with said gray-level code of a preselected adjacent block to generate said reconstructed gray-level value of said particular pel, hence reducing abrupt tonal changes between said blocks.

9. Apparatus pursuant to claim 7 where said pels are reconstructed from left to right on a line-by-line basis and when said gray-level value of a current pel on a current line is being reconstructed, a gray-level value for the previous pel on the same line, a gray-level value for the previous pel on the previous line, and a gray-level value for the current pel on the previous line are already known, said reconstructing means (168) further comprising:
- means for finding (173) an average value from said gray-level code of said block in which said current pel on said current line being estimated is a part, said gray-level value for said previous pel on said same line, said gray-level value for said previous pel on said previous line, and said gray-level value of said current pel of said previous line, said average value constituting said reconstructed gray-level value for said current pel on said current line.

10. Apparatus pursuant to claim 7 where said gray-level reconstructing means (68) comprises:
- means for interpolating (70, 80) vertically and horizontally said gray-level codes of predetermined neighboring blocks to a current block with said gray-level code of said current block to generate a reconstructed gray-level value for any pel in said current block.

11. Apparatus pursuant to claim 7 wherein said gray-level codes for said blocks are received from left to right on a row-by-row basis, where each said block comprises x columns of y pels and y lines of x pels; and when a gray-level value is being reconstructed for a current pel in a current column in a current block of a current row, horizontally graduated gray-level values for each column of pels of a neighboring block directly overhead, defined as a current block of the previous row are known, said reconstructing means (68) comprising:
- means for generating (73) a horizontal difference between said gray-level code of said current block of said current row with said gray-level code of the left neighboring block;
- means for multiplying (74) said horizontal difference with a predetermined multiple of 1/x to generate a horizontal incremental value for said current column containing said current pel;
- means for adding (75) said horizontal incremental value to said gray-level code of said left neighboring block to generate a horizontally graduated gray-level value for said current column;
- means for generating (82) a vertical difference between said horizontally graduated gray-level value for said current column with said horizontally graduated gray-level value of the corresponding column from the previous row of blocks;
- means for multiplying (83) said vertical difference with a predetermined multiple of 1/y to generate a vertical incremental value for said current pel; and
- means for adding (84) said vertical incremental value to said horizontally graduated gray-level value of said corresponding column from said previous row of blocks to generate said reconstructed gray-level value for said current pel.

12. A method for digitally encoding continuous-tone information from an original pictorial image having a total pictorial area (100) comprising the steps of scanning (12) discrete areas of said original image known as pels (102) on a line-by-line basis to generate input electrical signals indicative of the light intensity of each pel, and comparing (24) said input signals to a predetermined position-independent threshold signal to generate a detail binary signal (109) of black and white pels, the method further characterized by the additional steps of:
- comparing (31) said input signals to predetermined position-dependent reference threshold signals from a matrix of sample points to generate a gray-scale binary signal (108) of black and white pels, each of said sample points assigned by position to a particular pel from each of a plurality of subdivided two-dimensional blocks (104) of pels, each block forming a discrete pictorial area of the total pictorial area (100) of said original image; and
- counting (42) the black pels in said gray-scale binary signal for each two-dimensional block (104) to generate a value "N", which approximates the gray-level information of each subdivided block of pels.

13. The method pursuant to claim 12 further comprising the step of:
- converting (48) said value "N" for each block (104) to a gray-level binary code.

14. The method pursuant to claim 12 further comprising the step of:
- peaking (22) said input electrical signals before comparing them to said predetermined position-independent threshold signal to accentuate the contours and edges in said original image.

15. The method pursuant to claim 12 further comprising the steps of:
- subtracting (36) said detail binary signal (109) from said gray-scale binary signal (108) to modify said gray-scale binary signal prior to counting said number "N" of black pels in each block (104) to generate a lighter gray level for said blocks of pictorial area where black detail pels are generated.

16. The method pursuant to claim 12 further comprising the step of:
- compressing (26) said detail binary signal (109) according to a blob-encoding scheme.

17. The method pursuant to claim 12 where said position-dependent reference threshold signals are generated from an ordered dither matrix.

18. A facsimile transmission method including said encoding method of claim 13 further comprising the steps of:
- receiving (61) said detail binary signal and said gray-level codes; and reconstructing (68, 168) a gray-level value for each said pel (102) from said gray-level codes for said blocks (104) of pels.

19. The method pursuant to claim 18 where said gray-level reconstructing step further comprises the step of:
   interpolating (70) said gray-level code of said block containing said pel being reconstructed with said gray-level code of a preselected adjacent block to generate said reconstructed gray-level value for said particular pel, hence reducing abrupt tonal changes between said blocks.

20. The method pursuant to claim 18 where said pels are reconstructed from left to right on a line-by-line basis and when said gray-level value of a current pel on a current line is being reconstructed, a gray-level value for the previous pel on the same line, a gray-level value of the previous pel on the previous line, and a gray-level value for the current pel on the previous line are already known, said reconstructing step (168) further comprising the step of:
   finding (173) an average value from said gray-level code of said block in which said current pel on said current line being estimated is a part, said gray-level value for said previous pel on said same line, said gray-level value for said previous pel on said previous line, and said gray-level value of said current pel on said previous line, said average value constituting said reconstructed gray-level value for said current pel on said current line.

21. The method pursuant to claim 18 where said gray-level reconstructing step (68) further comprises the step of:
   interpolating (70, 80) vertically and horizontally said gray-level codes of predetermined neighboring blocks to a current block with said gray-level code of said current block to generate a reconstructed gray-level value for any pel in said current block.

22. The method pursuant to claim 18 where said gray-level codes for said blocks are received from left to right on a row-by-row basis, where each said block comprises x columns of y pels and y lines of x pels; and when a gray-level value is being reconstructed for a current pel in a current column in a current block of a current row, horizontally graduated gray-level values for each column of pels of a neighboring block directly overhead, defined as a current block of the previous row, are known, said reconstructing step (68) further comprising the steps of:
   generating (73) a horizontal difference between said gray-level code of said current block of said current row with said gray-level code of the left neighboring block;
   multiplying (74) said horizontal difference with a predetermined multiple of 1/x to generate a horizontal incremental value for said current column containing said current pel;
   adding (75) said horizontal incremental value to said gray-level code of said left neighboring block to generate a horizontally graduated gray-level value for said current column;
   generating (82) a vertical difference between said horizontally graduated gray-level value for said current column with said horizontally graduated gray-level value of the corresponding column from the previous row of blocks;
   multiplying (83) said vertical difference with a predetermined multiple of 1/y to generate a vertical incremental value for said current pel; and
   adding (84) said vertical incremental value to said horizontally graduated gray-level value of said corresponding column from said previous rows of blocks to generate said reconstructed gray-level value for said current pel.

23. Apparatus for digitally encoding information from a continuous-tone pictorial image having a total pictorial area (100) comprising means for scanning (12) discrete areas of said image known as pels (102) on a line-by-line basis to generate input electrical signals indicative of the light intensity of each pel, and first means for generating (20) high-resolution detail information for transmission, said first generating means including means for comparing (24) said input signals to a predetermined position-independent threshold signal to generate a detail binary signal (109) of black and white pels, said apparatus further characterized by:
   second means for generating (30) low-resolution gray-level information for transmission, said second generating means including means for comparing (31) said input signals to predetermined position-dependent reference threshold signals from a matrix of sample points to generate a gray-scale binary signal (108) of pels where each pel has a first or second state, each of said sample points assigned by position to a particular pel in each of a predetermined group (104) of pels, and said scanning means providing the input electrical signals commonly to both said first and second generating means for simultaneously obtaining the high-resolution detail information and the low-resolution gray-level information.

24. A method for digitally encoding information from a continuous-tone pictorial image having a total pictorial area (100) comprising the steps of scanning (12) discrete areas of said image known as pels (102) on a line-by-line basis to generate input electrical signals indicative of the light intensity of each pel, and generating high-resolution detail information for transmission, where said high-resolution generating step includes the step of comparing (24) said input signals to a predetermined position-independent threshold signal to generate a detail binary signal (109) of black and white pels, the method further characterized by the additional step of:
   generating (30) low-resolution gray-level information for transmission, where said low-resolution generating step includes the step of comparing (31) said input signals to predetermined position-dependent reference threshold signals from a matrix of sample points to generate a gray-scale binary signal (108) of pels where each pel has a first or second state, each of said sample points assigned by position to a particular pel in each of a predetermined group (104) of pels, and said scanning step providing the input electrical signals commonly for both said high-resolution generating step and said low-resolution generating step for simultaneously obtaining the high-resolution detail information and the low-resolution gray-level information.

25. Apparatus for digitally encoding information from a continuous-tone pictorial image having a total pictorial area (100) comprising means for scanning (12) discrete means of said image known as pels (102) on a line-by-line basis to generate input electrical signals indicative of the light intensity of each pel, and first means for comparing (24) said input signals to a predetermined position-independent threshold signal to generate a detail binary signal (109) of black and white pels, the apparatus further characterized by:

means for generating (30) gray-level information for each of a plurality of groups (104) of pels, each group forming a discrete pictorial area of the total pictorial area of said image, where said generating means comprises:

means for comparing (31) said input signals to predetermined position-dependent reference threshold signals from a matrix of sample points to generate a gray-scale binary signal (108) of pels where each pel has a first or second state, each of said sample points assigned by position to a particular pel in each group (104) of pels; and means for determining (38) a value "N" from said gray-scale binary signal, said value "N" representing the gray-level information of each group (104) of pels.

26. The apparatus pursuant to claim 25 where said determining means (38) further comprises:

means for counting (42) the number of pels (102) having the first state in said gray-scale binary signal (108) for each group (104), the counted number being the value "N" for said particular group.

27. A method for digitally encoding information from a continuous-tone pictorial image having a total pictorial area (100) comprising the steps of scanning (12) discrete areas of said image known as pels (102) on a line-by-line basis to generate input electrical signals indicative of the light intensity of each pel, and comparing (24) said input signals to a predetermined position-independent threshold signal to generate a detail binary signal (109) of black and white pels, the method further characterized by the additional step of:

generating (30) gray-level information for each of a plurality of groups (104) of pels, each group forming a discrete pictorial area of the total pictorial area of said original image, where said generating step comprises the steps of:

comparing (31) said input signals to predetermined position-dependent reference threshold signals from a matrix of sample points to generate a gray-scale binary signal (108) of pels where each pel has a first or second state, each of said sample points assigned by position to a particular pel in each group (104) of pels; and determining (38) a value "N" from said gray-scale binary signal, said value "N" representing the gray-level information of each group (104) of pels.

28. The method pursuant to claim 27 where said determining step (38) further comprises:

counting (42) the number of pels (102) having the first state in said gray-scale binary signal (108) for each group (104), the counted number being the value "N" for said particular group.

\* \* \* \* \*